(12) United States Patent
Vroom

(10) Patent No.: US 12,534,012 B1
(45) Date of Patent: Jan. 27, 2026

(54) MULTI-PIECE SHAFT FOR A SLIDING SUPPORT MECHANISM AND RV SYSTEMS UTILIZING SAME

(71) Applicant: VROOM SLIDE SYSTEMS, LLC, Tucson, AZ (US)

(72) Inventor: David H. Vroom, Tucson, AZ (US)

(73) Assignee: VROOM SLIDE SYSTEMS, LLC, Tucson, AZ (US)

( * ) Notice: Subject to any disclaimer, the term of this patent is extended or adjusted under 35 U.S.C. 154(b) by 0 days.

(21) Appl. No.: 19/264,783

(22) Filed: Jul. 9, 2025

Related U.S. Application Data

(60) Provisional application No. 63/675,823, filed on Jul. 26, 2024.

(51) Int. Cl.
*B60P 3/34* (2006.01)

(52) U.S. Cl.
CPC ..................... *B60P 3/34* (2013.01)

(58) Field of Classification Search
USPC ... 296/26.01, 26.05, 26.09, 26.13, 175, 165, 296/170, 171, 172, 174, 176
See application file for complete search history.

(56) References Cited

U.S. PATENT DOCUMENTS

| | | | | |
|---|---|---|---|---|
| 6,116,671 A * | 9/2000 | Schneider | ............... | B62D 33/08 74/30 |
| 9,050,923 B1 * | 6/2015 | Garceau | .................... | B60P 3/34 |
| 10,480,627 B1 * | 11/2019 | Vroom | ...................... | B60P 3/34 |
| 11,137,054 B2 | 10/2021 | Vroom | | |
| 2002/0084664 A1 * | 7/2002 | McManus | ................. | B60P 3/34 296/26.13 |
| 2004/0066060 A1 * | 4/2004 | Rasmussen | ............... | B60P 3/34 296/165 |
| 2005/0225109 A1 * | 10/2005 | Schneider | ................. | B60P 3/34 296/26.01 |
| 2011/0156430 A1 * | 6/2011 | Gardner | .................... | B60P 3/34 254/311 |
| 2013/0119700 A1 * | 5/2013 | Garceau | .................. | F16H 55/26 29/897 |
| 2015/0040700 A1 * | 2/2015 | Walls | ...................... | F16H 19/04 74/89.17 |
| 2015/0323122 A1 * | 11/2015 | Gardner | ................. | B66F 7/02 254/385 |
| 2020/0062164 A1 * | 2/2020 | Garceau | .................... | B60P 3/34 |
| 2020/0200243 A1 * | 6/2020 | Carlson | .................... | B60P 3/34 |
| 2020/0248785 A1 * | 8/2020 | Vroom | ..................... | B60P 3/34 |
| 2020/0248786 A1 * | 8/2020 | Vroom | ..................... | B60P 3/34 |
| 2021/0095745 A1 * | 4/2021 | Vroom | ..................... | B60P 3/34 |
| 2021/0270351 A1 * | 9/2021 | Vroom | ................... | F16H 19/04 |
| 2025/0236233 A1 * | 7/2025 | Vroom | ..................... | B60P 3/34 |

* cited by examiner

*Primary Examiner* — Gregory A Blankenship
(74) *Attorney, Agent, or Firm* — Quarles & Brady LLP; Yakov S. Sidorin

(57) ABSTRACT

A sliding support mechanism (for use with an RV slide-out module) utilizing a multi-piece-shaft in which constituent pieces, connected to one another length-wise, are substantially moveable with respect to one another such as to allow for accommodation of the non-planarity of the wall of the slide-out module when the module is extended along such wall. Methodology of using/operating the same.

20 Claims, 5 Drawing Sheets

MULTI-PIECE SHAFT FOR A SLIDING SUPPORT MECHANISM AND RV SYSTEMS UTILIZING SAME

CROSS-REFERENCE TO RELATED APPLICATIONS

This patent application claims priority from and benefit of the U.S. Provisional Patent Application No. 63/675,823 filed on Jul. 26, 2024. The disclosure of which is incorporated herein by reference.

RELATED ART

Motorized sliding support mechanisms are well-known and used to support structures the positions of which need to be changed under different circumstances. One example is provided by a motorized drawer. A more demanding example is a well-known "slide-out" module, commonly included in a recreational vehicle (RV) or motor home. RVs frequently include living spaces, which can be expanded when the vehicle is parked, to provide additional room. These "slide-outs" extend from the outer walls of the vehicle and are suspended over the ground. For convenience, and because slide-outs (or slide-out sections) can be extremely heavy, it is often desirable to equip them with a motorized mechanism or driver to automatically extend and retract the slide-out as desired. Some of these motorized mechanisms use a set of rack and pinions connected to the sides of the slide-out section(s). Electric motors drive the pinions, which are typically mounted in an assembly (including the motor and residing within a compartment within a side portion of the vehicle). The pinions, in turn, engage with the rack and drive a given slide-out forward or backward relative to the pinions.

As is well known in related art, the slide-out module is extended and retracted, along the sliding support mechanism, with the use of at least one motor (which is part of a motor assembly of the sliding support mechanism) that actuates the pinion (typically secured on the rotatable shaft of the motor assembly) meshed with the rack attached to a wall of the slide-out module. In light of the fact that rarely a side surface of an RV slide-out module is planar, the utilization of the conventionally structured sliding support mechanism (in which the rotational motion of the motor is translated to the linear motion of the slide-out motion along the rack with the use of a single-piece shaft, dimensioned typically as a rod) causes problems not only with installation of the sliding support mechanism but with operations of such mechanism as well.

Embodiments of the invention solve this problem by devising a sliding support mechanism (for use with an RV slide-out module) utilizing a multi-piece-shaft in which constituent pieces, connected to one another length-wise, are substantially moveable with respect to one another such as to allow for accommodation of the non-planarity of the wall of the slide-out module when extended along such wall.

SUMMARY OF THE INVENTION

Embodiments of the invention provide an article of manufacture that includes a sliding support mechanism configured to support and reversibly reposition the slide-out module with respect to the body. Such sliding support mechanism contains: (a) a motor assembly including a drive motor and a gearbox enclosed in a first housing unit, and an output rotor; and (b) a shaft having multiple shaft portions including first and second shaft portions that are substantially moveably connected to one another at at least one joint, the shaft attached to the output rotor at a first end of the shaft. In particular, the article of manufacture may include upper and lower shaft-and-pinion housings cooperated, respectively, with the first and second shaft portions, and be configured for unimpeded repositioning of a slide-out module of a recreational vehicle (RV), when attached to a corresponding wall, even in a presence of angular misalignment between the upper and lower shaft-and-pinion housing.

Embodiments of the invention also provide a method for using the embodiment of such article of manufacture by at least: repositioning the slide-out module of the RV in a direction substantially transverse to the shaft in a substantially un-impeded manner while the upper and lower shaft-and-pinion housings remain angularly misaligned with respect to one another and/or repositioning the slide-out module of the RV in a direction substantially transverse to the shaft in a substantially un-impeded manner while axes of the first and second shaft portions remaining angularly misaligned with respect to one another.

BRIEF DESCRIPTION OF THE DRAWINGS

The invention will be more fully understood by referring to the following Detailed Description of Specific Embodiments in conjunction with the Drawings, of which.

DETAILED DESCRIPTION

Rack-and-pinion sliding support mechanisms and mechanical elements of such mechanisms have been discussed in related art—for example, in the U.S. Pat. No. 11,137,054, the entire disclosure of which is incorporated by reference herein. In a typical rack-and-pinion sliding support mechanism, a single given shaft is coupled to corresponding pinion(s) configured to engage with one or more racks and is driven by a corresponding motors. A motor assembly is specifically designed to at least reduce the influence of torques generated by the motor and transferred to the pinions and to reduce motor failures, while the rack and pinion are structured to provide vertical and horizontal displacement to reduce premature component wear leading to poor gear mesh caused to by forces on the mechanism during use.

As practice shows on multiple occasions, utilization of various sliding support mechanisms substantially in every case when an embodiment of the single-piece shaft assembly is used, the proximity of the shaft (formatted as a single substantially straight rod of material) and the normally deviating-from-being-planar surface of the side-wall of the slide-out module causes, at a minimum, problem with installation-especially when the length of the single-piece shaft that has to be used is substantial.

Figure 1:
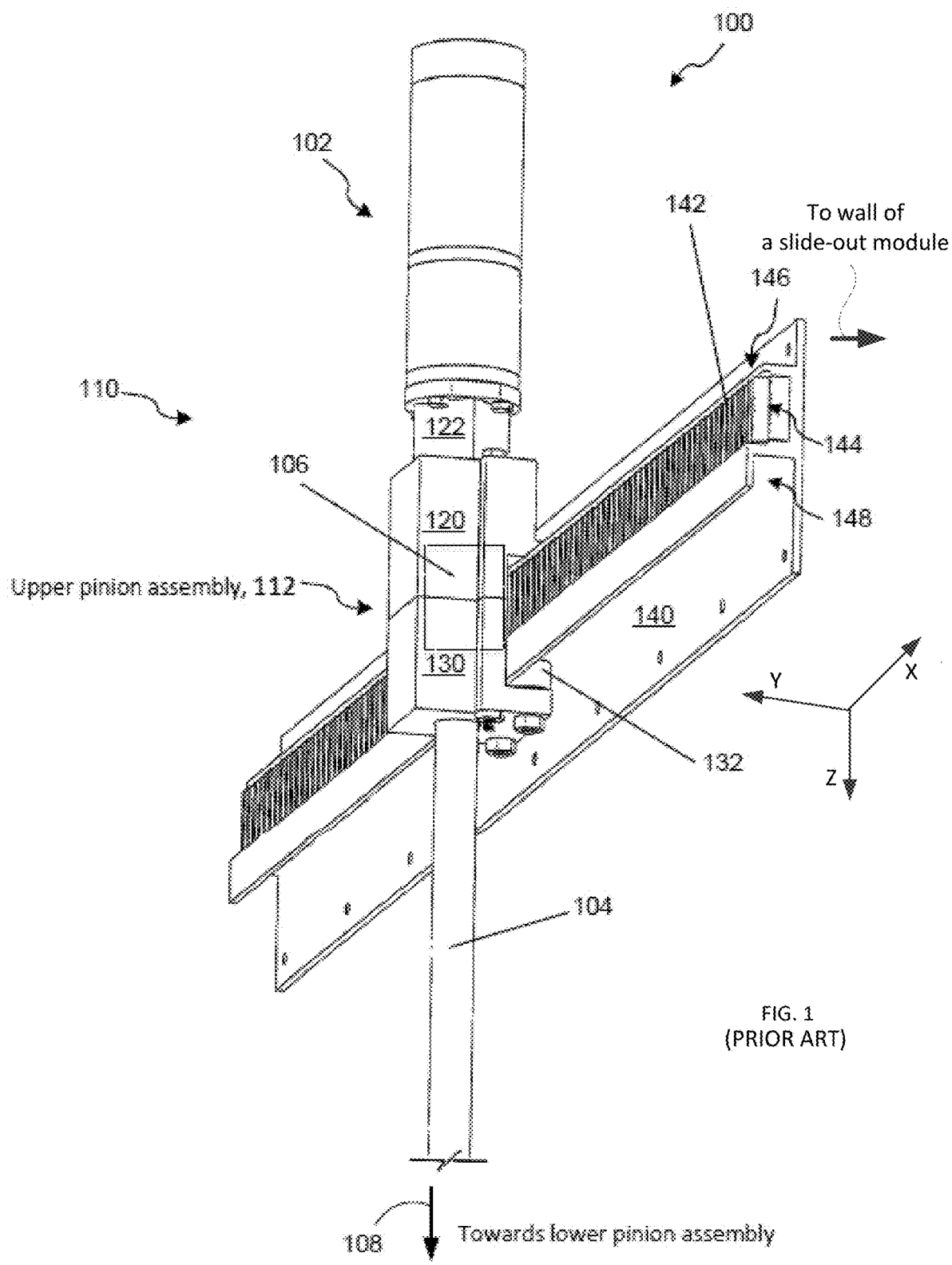
FIG. 1 illustrates, schematically, the conventional operable cooperation between the main body of the RV and the RV slide-out mechanism with the use of a sliding support mechanism. Here, as shown, the motor-and-shaft assembly is affixed to and secured at the body of the RV itself while the rack assembly secured to the EV slide-out mechanism.

To this end, FIG. 1 (corresponding to FIG. 1A of U.S. Pat. No. 11,137,054) schematically illustrates one non-limiting simplified example of a sliding support mechanism 100, structured according to the idea of related art. The skilled person recognizes that what is expressly shown in FIG. 1 is only the upper portion of the mechanism 100, which upper portion generally includes a shaft assembly 110 and a rack assembly 140. As shown in this specific example, the conventionally structured shaft assembly 110 includes a motor gearbox assembly 102 (interchangeably referred to herein as a motor assembly), a single-piece shaft 104 (rotated by the motor assembly when engaged with it), a pinion 106, and a housing unit that includes an upper shaft-and-pinion housing 120, and a lower shaft-and-pinion housing 130. (The presence of the lower portion of the mechanism, which substantially duplicates the operationally-cooperated rack-and-pinion sub-systems, is indicated with the arrow 108. Unlike the upper portion of the sliding mechanism expressly illustrated in FIG. 1, the lower portion of the mechanism (not shown in FIG. 1) does not include a motor assembly 102: the motor assembly is disposed only at one end of the shaft 104). The combination of the first upper shaft housing portion with the first lower shaft housing portion forms the first shaft housing. Understandably, in one specific case the first shaft housing can be formed (for example, molded or machined) as a unitary, monolithic piece, in which the first upper shaft housing portion and the first lower shaft housing portion are inseparable from one another, while in a related embodiment the first upper shaft housing portion and the first lower shaft housing portion are configured to be separable and, upon juxtaposing with and being attached to one another, for the first shaft housing.

In one specific case, the motor assembly 102 is operationally attached to the upper shaft-and-pinion housing 120 with a motor coupling 122, inside which the rotor of the motor assembly is coupled to the end of the shaft 104. (Related arrangements of coupling the rotor of the motor assembly with the shaft are discussed below.) The shaft assembly 110 includes at least one pinion 106, which is dimensioned to couple to the shaft 104 and to engage the rack assembly 140. For convenience, the upper shaft-and-pinion housing 120 and the lower shaft-and-pinion housing 130 of an upper pinion 106, taken together with the components they embrace or house or include, may be referred to as (an upper) shaft-and-pinion assembly 112. (Notably, in related implementations—for example, those discussed in U.S. patent application Ser. No. 19/029,214, the disclosure of which is incorporated by reference herein—the combination of the upper and lower shaft-and-pinion housings 120, 130 is implemented in a monolithic fashion, as a single-piece shaft-and-pinion housing-which provides various operational advantages.) It is understood, therefore, that the conventionally-structured shaft assembly generally includes the motor (gear-box) assembly 102, the shaft-and-pinion assembly 112 appropriately operationally coupled with the motor assembly 102 (that is, via the motor coupling 122 or in a different fashion as discussed below), and the single-piece shaft 104 passing therethrough. The shaft assembly 110 is configured to be coupled to a rack 142. The rack assembly 140 includes a rack 142 and a recess profile 144, in which the rack 142 is secured. The recess has a top surface 146, which forms a roof of the recess 144. The recess 144 typically includes a floor structure 148, which also forms or is dimensioned as an inverted U-shaped channel. The rack assembly 144 is shown with various holes to allow the rack assembly to be secured to an external object or structure (not shown) in order to enable this object or structure to be translated along the long axis of the rack 142.

Optionally, the conventionally structured shaft assembly can be configured to enable simple engagement and disengagement of the shaft with or from the motor assembly. FIG. 2 shows one such implementation 200 illustrated in two different configurations, 200a and 200b. Together, these configurations illustrate the ability to manually disengage the single-piece shaft 104 from the motor assembly 102 (not pictured fully in FIG. 2). To simplify the understanding of the differences between the two configurations, only those structural elements that are arranged differently in configurations 200a and 200b are labeled for configuration 200b. Although the components of the shaft assembly 110 may be provided as discrete parts of sub-assemblies, portions of the foregoing discussion will describe shaft assembly 110 in a fully assembled state.

Figures 2A, 2B:
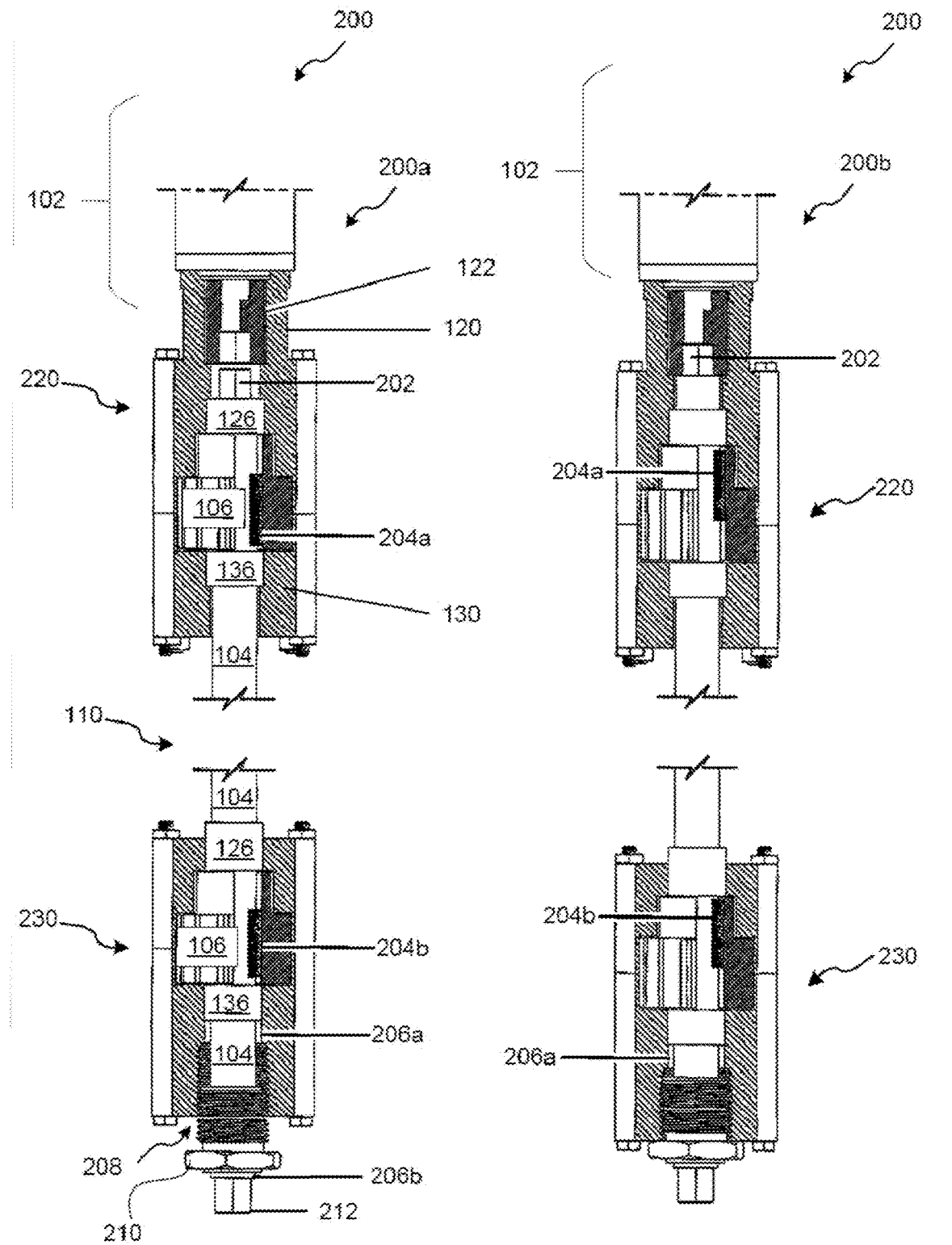
FIGS. 2A, 2B provide cross-sectional views of a portion of the embodiment of the sliding support mechanism, showing both the upper shaft-and-pinion assembly and the lower shaft-and-pinion assembly and where the shaft and the motor assembly are disengaged (FIG. 2A) and engaged (FIG. 2B).

Specifically, FIGS. 2A, 2B illustrate a specific embodiment 200 (in which the shaft assembly 110 includes an upper shaft-and-pinion assembly 220 and a lower shaft-and-pinion assembly 230) in two configurations 200a and 200b, and in which the single-piece shaft 140 is cooperated with the motor assembly 102 with the use of a motor coupling element. Here, the configuration 200a of the shaft assembly 110 illustrates the initial state of the cooperation between the shaft and the motor assembly—in which the shaft is disengaged from the motor assembly. On the other hand, when the shaft assembly 110 is in configuration 200b, the single-piece shaft 104 is coupled to and operationally engaged with the motor assembly 102.

Each shaft-and-pinion assembly (whether upper or lower) is structurally similar to the shaft-and-pinion assembly 112 discussed in reference to FIG. 1. Each of the pinion assemblies 220, 230 includes a corresponding pinion 106 as well as an upper bearing 126 and a lower pinion bearing 136 through which the single-piece shaft 104 passes. These components of each of the upper and lower pinion assemblies are covered by the corresponding housing structures. In the specific example of FIG. 2, the single-piece shaft 104 is keyed in two locations, having an upper key 204a and a lower key 204b. These two keys (204a and 204b) fit into a recess (not shown) in the respective (upper or lower) pinion 106, coupling the single-piece shaft 104 to such pinion 106 when the shaft 104 rotates around its axis. (Additional detail of the pinions 106 and keys (204a, 204b) are discussed below, and are visible in greater detail in U.S. Pat. No. 11,137,054).

The keys 204a and 204b can each be made shorter than the overall length of the pinion 106, thereby allowing the single-piece shaft 104 to translate up and down along a direction parallel to the length of the shaft assembly 110. The shaft passes through a fastener 210 at the bottom of the shaft assembly 110. The fastener 210 both holds the shaft 104 in place and allows the vertical position of the shaft 104 to be adjusted to engage the shaft 104 with the motor coupling 122 or disengage it from the motor coupling 122.

The single-piece shaft 104 is provided with two annular extensions 206a and 206b, one or more of which may be attached to the shaft after the shaft 104 is passed through the fastener 210 and the bearings (124, 134) within the two upper shaft-and-pinion housing 120 and lower shaft-and-pinion housing 130. These annular extensions may be configured as known structures (such as split-rings or other suitable structures) and serve to widen the shaft 104 where the extensions are installed. In some embodiments, the shaft 104 may be provided with recesses dimensioned to receive the annular extensions. As shown, in FIGS. 2A, 2B, the annular extension 206a is placed just above the point at which the shaft 104 begins to pass through the top side of the fastener 210. The second annular extension 206b is placed at the point where the shaft 104 exits the bottom of the fastener 210.

It is appreciated that, when the shaft assembly 110 is initially in configuration 200a, the shaft 104 is uncoupled from the motor coupling 122, but is retained within the shaft assembly 110 by at least annular extension 206a pressing against the top of edge of the fastener 210. If and when the fastener 210 is inserted further into the aperture 208 in the bottom of the shaft assembly 110, the fastener 210 pushes against the annular extension 206a, thereby pushing the shaft 104 upwards toward the motor coupling 122.

When the fastener 210 is fully inserted into the aperture 208, the top end 202 of the shaft 104 is driven into the motor coupling 122, thereby coupling the shaft 104 to the motor 102. As depicted, the top end 202 of the shaft 104 resembles a hex bolt and is configured to mate with a correspondingly-shaped opening in the motor coupling 122. The fastener 210 may be a suitable structure such as a pin or bolt with a channel dimensioned to receive the shaft 104. In certain embodiments, the aperture 208 may be threaded and the fastener 210 may be configured with complementary threads. In these and other embodiments, the fastener 210 may be configured to have a hexagonal cap, thus enabling the fastener 210 to be inserted and withdrawn using standard tools such as a wrench or crank.

When the shaft assembly 110 is in configuration 200b, with the fastener 210 fully inserted into the aperture 208 and the shaft 104 coupled to the motor gearbox assembly 102, the shaft 104 may be disengaged from the motor assembly 102 by withdrawing by partially fastener 210 from the aperture 208. When the fastener 210 is withdrawn from the aperture 208, the top edge of the fastener 210 pushes downward against the annular extension 206b, thereby withdrawing the shaft 104 from the motor coupling 122, as indicated by the position of the top end 202 of the shaft 104 in configuration 200a. While the process of withdrawing the shaft 104 might allow the shaft to fall out of the motor coupling 122 under the influence of gravity, the presence of the annular extension 206b provides additional downward force to ensure that the shaft 104 disengages despite possible friction due to thermal expansion or slight flexion of the shaft 104 (which might otherwise prevent the shaft 104 from disengaging easily).

Notably, the keys 204a and 204b of the shaft 104 remain coupled to the pinions 106 in both configurations 200a and 200b. This coupling enables that the shaft assembly 110 (and particularly the pinions 106) to remain engaged with the rack assembly 140 corresponding to each pinion 106 and enables the rack assemblies 140 to move freely when they are pushed or pulled upon while the shaft 104 is disengaged from the motor assembly 102. Notably, even in configuration 200a, the shaft assembly 110 remains fully assembled. In the event of a motor failure, a user of the sliding support mechanism needs only to loosen the fastener 210 to restore (manual) functioning of the mechanism.

In certain embodiments, one or more of the keys 204a and 204b are configured to prevent each fastener 210 (and thus the shaft 104) from being completely removed from the aperture 208 when the shaft assembly 110 is fully assembled. In other embodiments, each fastener 210 may be provided with a visual indicator (such as a colored area, a line, or other marking) indicating how far the fastener 210 (and therefore the shaft 104) may be safely withdrawn.

As the skilled person knows well, the use of various sliding support mechanisms proves that, substantially in every case when an embodiment of the single-piece shaft assembly is used, the proximity of the shaft (formatted as a single substantially straight rod of material) and the normally deviating from being planar surface of the side-wall of the slide-out module often causes the problems with installation-especially when the length of the single-piece shaft 104 that has to be used is substantial. These problems manifest in the shaft "running" into such a non-planar surface once the rack assemblies 140 (associated with the upper and lower shaft-and pinion assemblies or with monolithic/single-piece shaft-and-pinion assemblies, whatever the case may be) are attached to the wall of the slide-out module, which causes inability of maintaining an operationally-sufficient gap between the single-piece shaft and such non-planar surface.

According to the idea of the invention—and in reference to FIGS. 2A and 2B—this problem is solved by structuring the shaft to be composed from multiple shaft portions or piece that are substantially moveably (and, preferably, removably) connected to one another at corresponding ends. For example, an embodiment of a multi-piece shaft structured according to the idea of the invention may include at least two moveably-interconnected with one another shaft pieces or portions: a first portion of the shaft carrying the pinion of the upper shaft-and-pinion assembly 230 and a second portion of the shaft carrying the pinion of the lower shaft-and-pinion assembly 230. Such first and second portions of the overall shaft are moveably cooperated with one another at the corresponding ends. As a result of such implementation, an article of manufacture is formed that includes a sliding support mechanism that is configured to support and reversibly reposition a slide-out module with respect to a body of an RV and that contains (a) a motor assembly including a drive motor and a gearbox and an output rotor, and (b) a shaft having at least one joint and first and second shaft portions substantially moveably connected to one another at the at least one joint, the shaft being connected to the output rotor at a first end of the shaft.

The skilled person will readily understand the minutia of implementation of such two-piece shaft without referring to any particular drawing.

Figure 3:
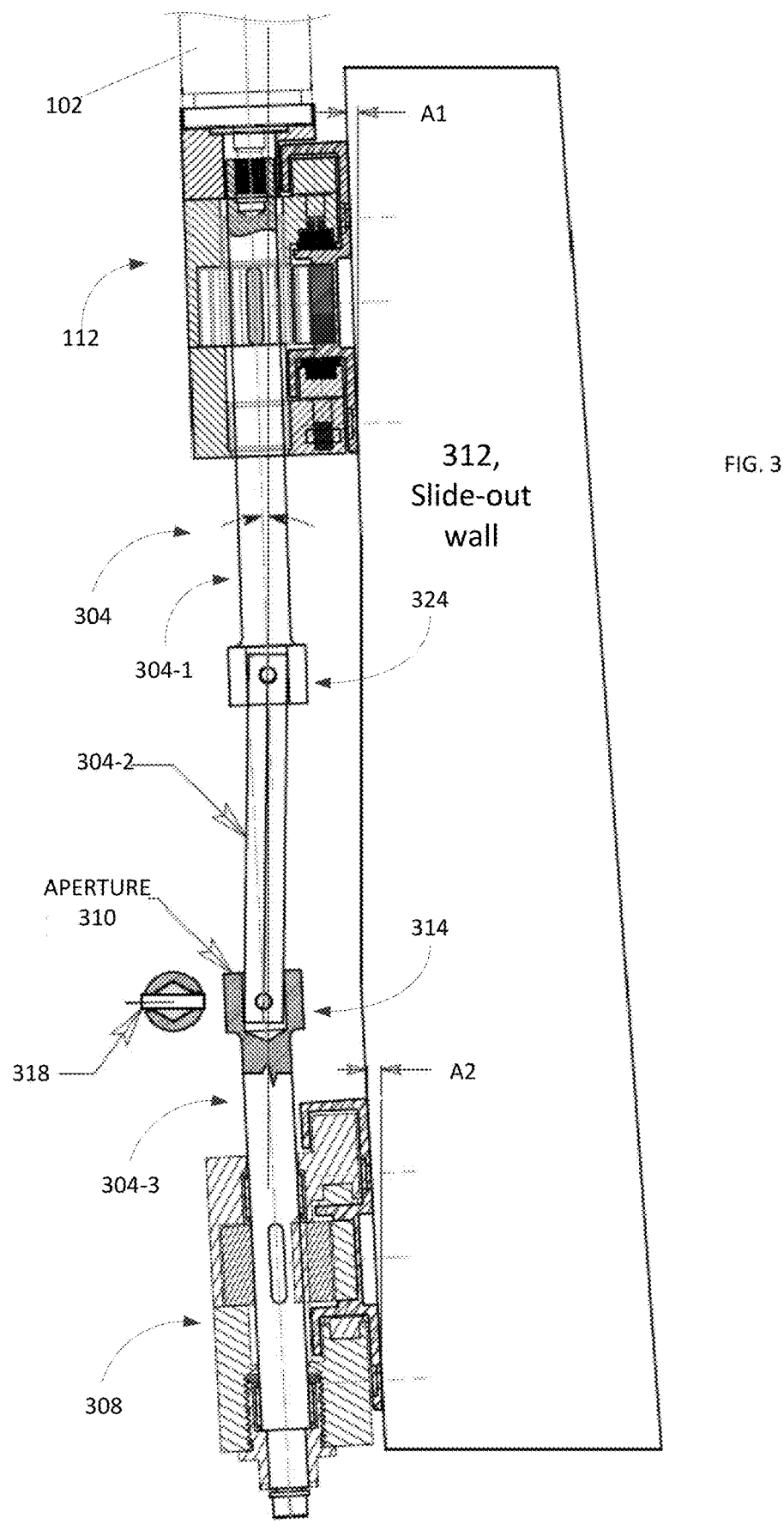
FIG. 3 illustrates a portion of an embodiment of the sliding support mechanism structured according to the idea of the invention and including a multi-piece shaft.

In addition, FIG. 3 illustrates a specific non-limiting three-piece version of the implementation of the idea of the invention, shown attached to the slide-out module wall the exhibits two angular deviations from the plane—in the upper portion of the wall (by an angle A1) and in the lower portion of the wall (by an angle A2). To accommodate and obviate these imperfections of the wall of the slide-out module, an embodiment of the multi-piece shaft 304 may include a first (upper) portion of the shaft 304-1 (which carries the pinion 106 of the upper shaft-and-pinion assembly 220 housed in the corresponding housing structure) and at least one other, a (lower) portion 304-3 of the shaft (which carries the pinion of the lower shaft-and-pinion assembly indicated here as 308 housed in the corresponding shaft-and-pinion housing), and a third (here shown as a middle) portion 304-2 of the multi-piece shaft 304 that connects the upper and lower shaft portions 304-1, 304-3 with one another. In one specific case, one of the cooperated with one another portions of the shaft may be equipped with a specifically-structured aperture dimensioned to be preferably oversized to accept therein an end of the other portion and an additional fastening element configured to secure such end in the aperture one the end has been inserted into the aperture. In the example of FIG. 3, such aperture is shown as aperture 310 formed at the end of the shaft portion 304-3 and dimensioned to ensure such type of a clearance fit between the end of the portion 304-2 of the multi-piece shaft and the internal surface of the aperture 310 that enables the mutual tilt of the portions 304-2 and 304-3 when such portions are connected with one another. (For example, the dimensions of the end of the portion 304-2 and the aperture 310 at the corresponding end of the portion 304-3 may be chosen to ensure an easy slide fit, a running fit, a loose running fit, or a free running fit, as understood in related art; see, for example, learnmech.com/engineering-fits-clearance-transition-interference-fit).

The joint 314 formed by the corresponding ends of the portions 304-2, 304-3 may be structured to include—in one specific case illustrated in FIG. 3-a removable pin 318 affixed across the aperture 310 and passing through the opening in the end of the portion 304-2. When present, the pin 318 is preferably fit to the portion 304-2 but is oversize to the aperture 310 so that drive torque from the motor assembly 102 can be easily transmitted to the portion 304-3 through the portions 304-1, 304-2.

The joint 324 dimensioned to connect with one another corresponding ends of the shaft portions 304-1, 304-2 can be structured substantially similarly to the joint 314, at least in one implementation. In one specific implementation of the multi-piece shaft, the middle portion 304-2 of the shaft may be dimensioned to have a polygonal (in a non-limiting example—hexagonal) cross-section while the apertures 310 at the ends of the shaft portions 304-1, 304-3 may have correspondingly-dimensioned (polygonal) cross sections. Understandably, the portions 304-1, 304-2, 304-3 of the discussed embodiment of the multi-piece shaft should be appropriately dimensioned to enable the tilt between the axes of the portions 304-1, 304-2 of at least A1 degrees and the tilt between the axes of the portions 304-2, 304-3 of at least A2 degrees, to compensate for and accommodate the un-evenness of the surface of the slide-out wall 312 and to ensure reliable rotation of the multi-piece shaft about the axis of the output rotor of the motor assembly 102 during the operation of the sliding support mechanism.

The cooperation between the shaft portion 304-1 and the output rotor of the motor assembly 102 can be structured with the use of a substantially flat surface at the output rotor, a specifically structured bearing that is configured to receive the shaft portion 304-1 and encircle it at a point the output rotor and an end of the portion 304-1, or with the use of a structure employing splines—such as that discussed in reference to, for example, FIGS. 7A, 7B, 7C of U.S. Pat. No. 11,137,054.

Figure 4:
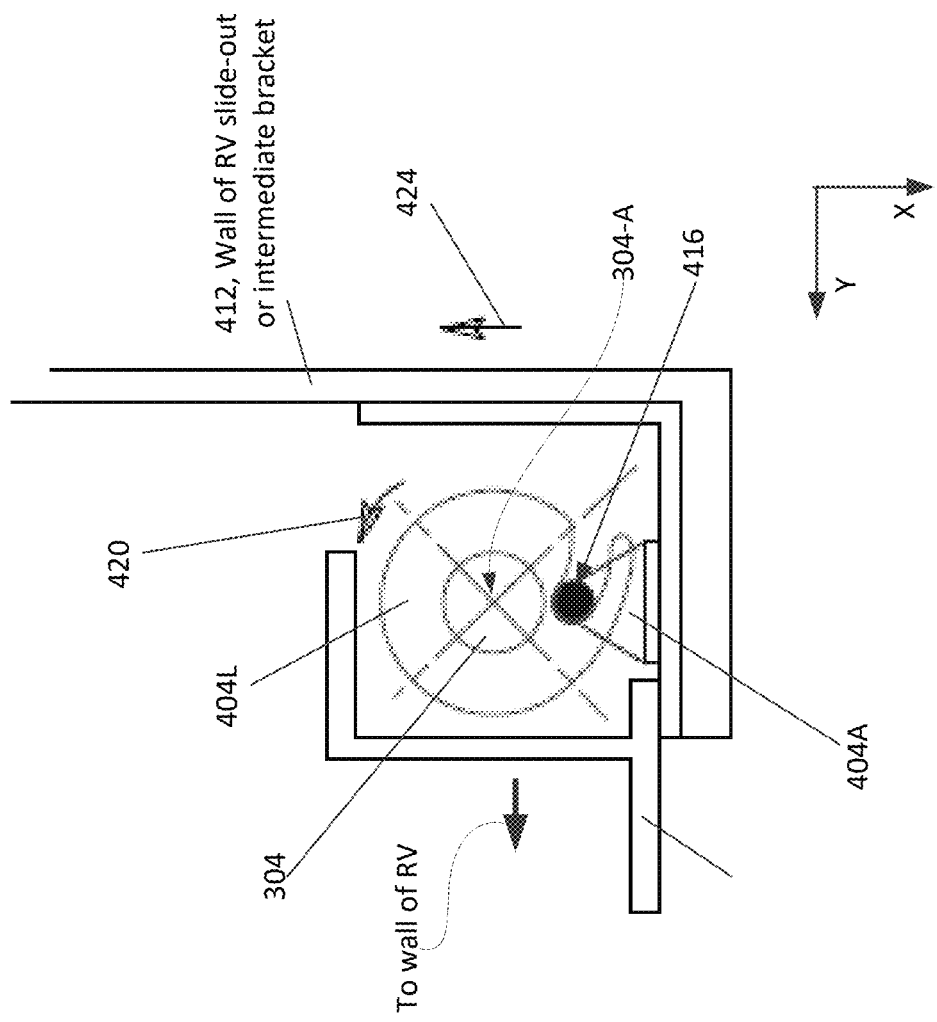
FIG. 4 presents a schematic of operable coordination between the components of an embodiment of the anchoring mechanism for optional use with an embodiment of the sliding mechanism: one component being secured on the multi-piece shaft of the motor assembly, another-on a wall of the slide-out module.

An embodiment of the sliding support mechanism may optionally be complemented with a specific anchoring mechanism. For example, FIG. 4 schematically illustrates, in a view taken along the shaft 304 and along the shaft axis 304-A, the principle of mechanical coordination between the components of an embodiment of the anchoring mechanism structured according to the idea of the invention. These components include a latch portion 404L (which is configured to be affixed on the shaft 304 of the motor assembly that in turn is secured—optionally, indirectly but through an appropriate structural bracket—to the wall of the RV) and an anchor portion 404A (which is configured to be secured to the wall of the slide-out module or to some intermediate harness/structure/bracket 412 that in turn is secured to the wall of the slide-out module). In this specific but non-limiting implementation, the anchor portion 404A includes a pin or rod or anchor bracket 416 (extending, in the local system of coordinates, along the z-axis). The rack 142 is not indicated in FIG. 4 for simplicity of illustration. FIG. 4 depicts the moment when the latch portion 204L has already engaged the anchor portion 404A (which substantially coincides with the moment when the slide-out module is in the retracted position), thereby mechanically securing the slide-out module in its retracted position.

Figure 5:
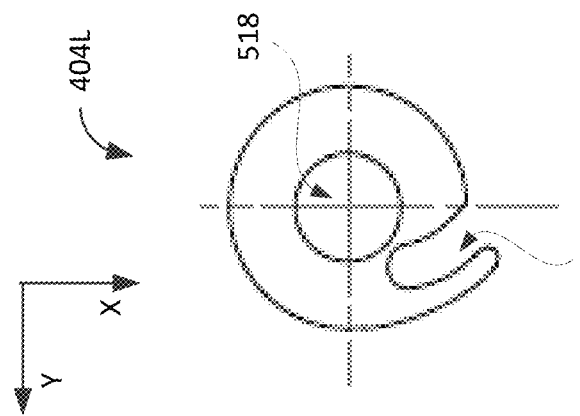
FIG. 5 is a top view of an embodiment of a latch portion of the embodiment of the anchoring mechanism illustrated in FIG. 4.

FIG. 5 indicates one non-limiting embodiment of the latch portion 404L, which is generally dimensioned as a plate of material that has a predetermined thickness, a slot 514 formed across such thickness (in the body of the plate), and an opening 518 throughout the thickness of the plate. The slot 514 defines a part 522 of the latch portion that may be interchangeably referred to herein as a hook and that is separated from the opening 518 with the slot 514 along at least one radial direction (identified with respect to the axis of the opening 518; in this example, the axis of the opening 518 is extending along the z-axis.) The opening 518 is judiciously dimensioned to enable the latch portion 504L to be removably affixed on the multi-piece shaft 304 via, for example clearance fit or transition fit (as known in related art).

During the process affixation of the latch portion such as a portion 404L to the multi-piece shaft 304, the shaft 304 is passed through the opening 518 along the axis of the opening 518 and the portion 404L is secured on the shaft at an identified location along the shaft. (In at least one specific case, the affixation of the latch portion 404L to the shaft 304 may be configured to be reversible, such that an axial position of the latch portion 304L on the shaft 304 can be changed and/or the latch portion 404L can be completely removed from the shaft 304.) Then, in operation of the sliding mechanism (such as the mechanism 100) now complemented with the multi-piece shaft 304 and the latch portion 304L attached to the shaft 304, the latch portion is caused to rotate about the shaft axis 304-A substantially synchronically with rotation of the shaft 304 about the shaft axis 304-A. The azimuthal orientation of the latch portion 404L on the shaft 304 is judiciously clocked or timed to ensure that at a moment when the slide-out module, driven by the rotation of the motor 102 is substantially fully retracted and the anchor portion 404A (secured to the wall of the slide-out module that is linearly repositioned along the arrow 424 has substantially approached the latch portion 404L, the anchor bracket 416 is received by the slot 514 and positioned within the slot 514. Referring again to FIG. 2, such rotation of the motor and the shaft 104 (causing the retraction of the slide-out module along the arrow 424) is indicated with the arrow 420.

It is understood, therefore, that one embodiment of the anchoring mechanism may include a latch portion configured as a plate of material that has a thickness, a slot in the thickness, and an opening throughout the thickness (here, the opening is preferably dimensioned to have the latch portion affixed on a portion of the first and second portions of the shaft to have such portion passing therethrough and to have the latch portion rotatable about a shaft axis substantially synchronically with rotation of the shaft about the shaft axis). In at least one case, the anchoring mechanism may be complemented with an anchor portion dimensioned to be received into the slot as a result of rotation of the latch portion about the shaft axis and to be released from the slot as a result of counter-rotation of the latch about the shaft axis.

Figure 6:
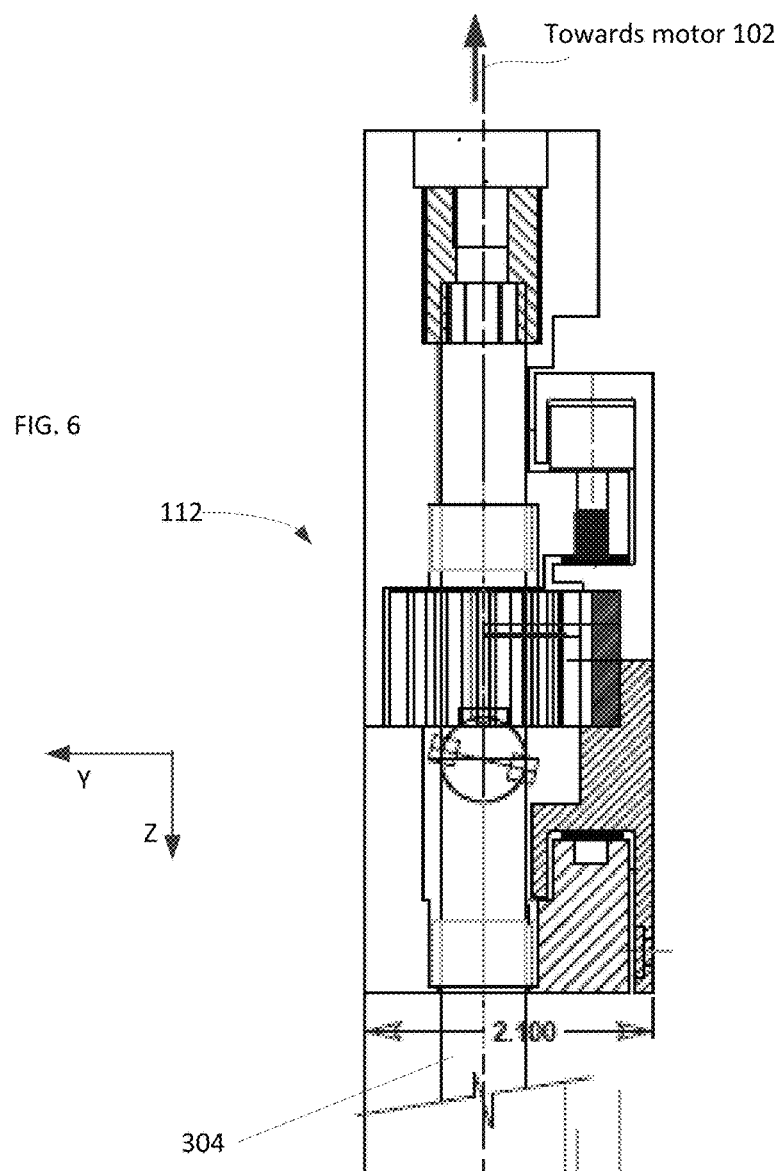
FIGS. 6 and 7 illustrate operable spatial coordination of the components of the embodiment of the anchoring mechanism with the shaft of the sliding support mechanism.
Figure 7:
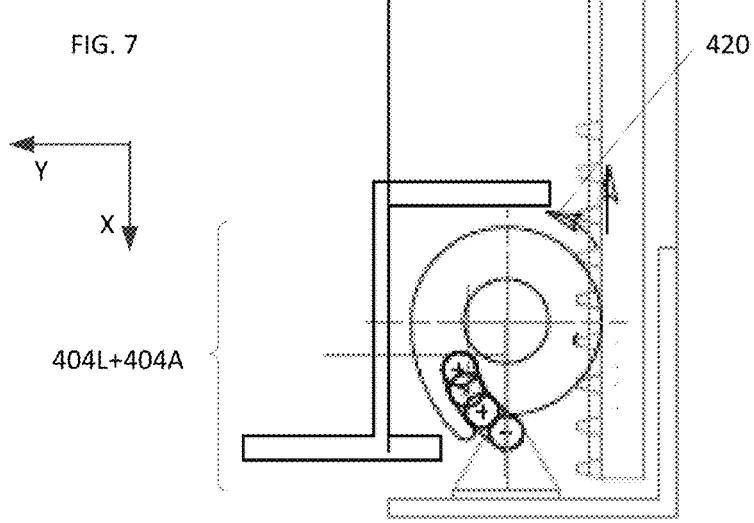

FIGS. 6 and 7 schematically illustrate mutual operable spatial coordination between the embodiment of the anchoring mechanism and the motor assembly/multi-piece shaft of the sliding supporting mechanism of the RV. Here, FIG. 6 displays schematically in side cross sectional view, a non-limiting embodiment upper shaft-and-pinion assembly 112 (contents of which are discussed in more detail in, for example, U.S. Pat. No. 11,137,054) with the shaft 304 extending from it while FIG. 7 presents (in a view perceived along the shaft 104) the embodiment of the anchor mechanism (404L+404A) cooperated with the portions of the RV, simultaneously schematically indicating positions of the anchor pin/bracket 416 assumed within the slot 518 upon the rotation of the shaft 304 in a direction of the arrow 420.

Overall, as the skilled person will readily appreciate, because the shaft of the sliding mechanism is angularly locked to both upper and lower shaft-and-pinion housing by, respectively, upper and lower bearings or other means to provide proper gear mesh, connecting such housings them to the rough-constructed slide out wall can result in angular misalignment that must be provided for. Accordingly, embodiments of the invention provide specific means for allowing for such angular misalignment between the upper and lower shaft-and-pinion housings when the sliding support mechanism is attached to the wall of a slide-out, thereby ensuring that repositioning of the slide-out module in a direction substantially transverse to the shaft is carried out in a substantially un-impeded manner despite such angular misalignment (when present).

Implementations of the idea of the invention address a fashion in which the upper shaft-and-pinion housing is at least operationally isolated and/or decoupled from the lower shaft-and-pinion housing using a multi-portion shaft utilizing joint(s) connecting such multiple portions and—in one specific case—using a three-portion shaft utilizing swivel joints at the respective connected-to-one-another ends of the shaft portions. While a full universal joint may be optionally employed for this purpose, such joint may not be required due to a small (but operationally limiting, nevertheless) amount of angular misalignment typically caused by un-evenness of the wall, si simple wobble-joints as described substantially suffice.

In at least one specific case, the upper shaft-and-pinion housing may be connected to corresponding channel(s) of the rack assembly by placing dedicated rollers in such channels, and the lower shaft-and-pinion housing—with rollers in channels that lock alignment with the housing, or some other means as described above. with stub portions (outer portions) of the multi-piece shaft coming out of the shaft-and-pinion housings and connected to each other through a separate, intermediate shaft portion with judiciously structured connections/joints that allow for angular misalignment between the shaft-and-pinion housings. Preferably, the employed shaft joints are structured to not allow for being pulled apart (in which case a spline connection between the drive motor and the shaft assembly can be pulled apart, thereby releasing the slide-out module for manual movement in case of electrical failure as discussed, for example, in U.S. Pat. No. 11,137,054).

Understandably, each of the sliding support mechanism equipped with an embodiment of a multi-piece shaft (and, optionally, an embodiment of the anchoring mechanism, the RV containing such sliding support mechanism, and the methodology of operation of the sliding support mechanism (optionally equipped with the anchoring mechanism to secure the slide-out module in the substantially fully retracted position and/or release the slide-out module from being secured in the substantially fully retracted position) remain within the scope of the invention. The operation of such sliding support mechanism can be configured to be performed manually or automatically (for example, with the use of the appropriate electronic circuitry and/or as governed by a processor), if desired in a specific implementation.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. In some specific cases, which are within the scope of the invention, the terms "approximately" and "about", when used in reference to a numerical value, represent a range of plus or minus 20% with respect to the specified value, more preferably plus or minus 10%, even more preferably plus or minus 5%, most preferably plus or minus 2% with respect to the specified value.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

While the invention is described through the above-described examples of embodiments, it will be understood by those of ordinary skill in the art that modifications to, and variations of, the illustrated embodiments may be made without departing from the inventive concepts disclosed herein. Disclosed aspects, or portions of these aspects, may be combined in ways not listed above. Accordingly, the invention should not be viewed as being limited to the disclosed embodiment(s).

The invention claimed is:

1. An article of manufacture comprising:
   a sliding support mechanism configured to support and reversibly reposition a slide-out module of a recreational vehicle (RV) with respect to a body of the RV, the sliding support mechanism comprising:
      a motor assembly including a drive motor and a gearbox enclosed in a first housing unit, and an output rotor;
      a shaft having multiple shaft portions including first and second shaft portions that are substantially moveably connected to one another at at least one joint, the shaft attached to the output rotor at a first end of the shaft; and
      upper and lower shaft-and-pinion housings cooperated, respectively, with the first and second shaft portions,
   wherein said article is configured to support un-impeded reversible repositioning of the slide-out module of the RV, when attached to a corresponding wall, even in a presence of and despite an angular misalignment between the upper and lower shaft-and-pinion housings.

2. An article of manufacture according to claim 1, wherein the shaft is in direct contact with the output rotor at the first end of the shaft.

3. An article of manufacture according to claim 1, further comprising:
   a shaft-and-pinion housing, of the upper and lower shaft-and-pinion housings, that has a first opening therethrough and a second opening therethrough, the first and second opening being co-axial with an opening axis, the first and second opening dimensioned to accommodate the shaft therethrough.

4. An article of manufacture according to claim 3, wherein the shaft-and-pinion housing is configured as a single-piece monolithic profile of a chosen material that includes
   a hard exterior of the shaft-and-pinion housing having said first opening therethrough and said second opening therethrough,
      wherein a separation distance between a first portion of the hard exterior carrying the first opening and a second portion of the hard exterior carrying the second opening is dimensioned to reversibly receive a pinion in a space between the first and second openings;
   and
   a first retaining element protruding from the first portion of the hard exterior and a second retaining element protruding from the second portion of the hard exterior, wherein at least one of said first and second retaining elements is configured to fit dimensionally into a receiving portion of a rack assembly of the sliding support mechanism such as to limit repositioning of the shaft-and-pinion housing along the opening axis and along a first axis transverse to the opening axis;
   wherein a space between the first portion of the hard exterior and a second portion of the hard exterior is not limited along a second axis that is transverse to both the first axis and the opening axis.

5. An article of manufacture according to claim 1, further containing a third shaft portion separated from the first shaft portion by the second shaft portion, an axis of the first shaft portion and/or an axis of the third shaft portion being tiltable with respect to an axis of the second shaft portion.

6. An article of manufacture according to claim 1, wherein at least one of the following conditions is satisfied:
   (a) an end of the output rotor coupled to the first end of the shaft is structured to contain first splines while the first end of the shaft is structured to contain second splines that are dimensioned to mate and mesh with the first splines to transfer torque from the output rotor to the shaft;
   (b) the end of the output rotor coupled to the first end of the shaft is dimensioned to contain a flat surface along an axis of the output rotor;
   (c) the sliding support mechanism further comprises a bearing configured to receive the shaft and encircle the shaft at a point between the output rotor and a second end of the shaft.

7. An article of manufacture according to claim 1, wherein the sliding support mechanism further comprises:
   a first rack having a first translational axis, a first upper sliding surface, and a first lower sliding surface, and wherein at least one of the following conditions is satisfied:
      a) the first upper sliding surface defines a first upper U-shaped channel having a first upper height and a first upper width; and
      b) the first lower sliding surface defining a first lower U-shaped channel having a first lower height and the first lower width;
   and
   a first shaft-and-pinion assembly, including:
      a first pinion that is configured to be coupled to the first rack and that is secured on the shaft; and
      a first shaft-and-pinion assembly housing configured to cover at least the first pinion.

8. An article of manufacture according to claim 1,
   wherein, when the sliding support mechanism includes two shaft-and-pinion assemblies connected to opposing ends of the shaft, the shaft necessarily includes a third shaft portion that is:
      coupled to a shaft-and-pinion assembly, of the two shaft-and-pinion assemblies, at one end of the third shaft portion and
      coupled substantially moveably to the second shaft portion via a joint at the other end of the third shaft portion.

9. An article of manufacture according to claim 8, wherein, when the sliding support mechanism includes the two shaft-and-pinion assemblies, each of the two shaft-and-pinion assemblies contains a respective pinion configured to be coupled to a respective rack and a corresponding shaft-and-pinion assembly housing configured to cover at least the respective pinion.

10. An article of manufacture according to claim 1, wherein a shaft-and-pinion housing of all shaft-and-pinion housings present in the article of manufacture includes:
an upper shaft-and-pinion housing portion and a lower shaft-and-pinion housing portion, wherein the upper shaft-and-pinion housing portion is configured to engage a rack corresponding to said upper shaft-and-pinion housing above a corresponding pinion while the lower shaft-and-pinion housing portion is configured to engage said rack below the corresponding pinion.

11. An article of manufacture according to claim 10, wherein at least one of the following conditions is satisfied:
(a) the upper shaft-and-pinion housing portion comprises a first wear surface configured to laterally slide on an upper sliding surface of the corresponding rack and/or at least two upper rollers and/or an upper retaining element configured to run within an upper U-shaped channel; and
(b) the lower shaft-and-pinion housing portion comprises a second wear surface configured to laterally slide on a lower sliding surface of the corresponding rack and/or at least two lower rollers and/or a lower retaining element configured to run within a lower U-shaped channel.

12. An article of manufacture according to claim 11, wherein dimensions of the upper U-shaped channel and the lower U-shaped channel and dimensions of the at least two upper rollers and/or the upper retaining element and the at least two lower rollers and/or the lower retaining element are defined to maintain a corresponding pinion and a corresponding rack in mutual alignment and operable engagement while countering a torque applied to said corresponding rack during an operation of the motor assembly.

13. An article of manufacture according to claim 11, wherein no opening of the upper U-shaped channel and no opening of the lower U-shaped channel is facing in a direction transverse to the shaft.

14. An article of manufacture according to claim 1, further comprising:
an anchoring mechanism that includes:
a latch portion configured as a plate of material that has a thickness, a slot in the thickness, and an opening throughout the thickness,
wherein the opening is dimensioned to have the latch portion affixed on a portion of the first and second portions of the shaft to have said portion passing therethrough and to have the latch portion rotatable about a shaft axis substantially synchronically with rotation of the shaft about the shaft axis.

15. A recreational vehicle (RV) comprising the article of manufacture according to claim 1.

16. An RV according to claim 15,
wherein, when parts of the sliding support mechanism, which includes two shaft-and-pinion assemblies connected to opposing ends of the shaft, are appropriately affixed to respectively corresponding walls,
an axis of the first shaft portion of said multiple shaft portions is tilted with respect to an axis of the second shaft portion of said multiple shaft portions.

17. An RV according to claim 15,
wherein, when parts of the sliding support mechanism, which includes two shaft-and-pinion assemblies connected to opposing ends of the shaft containing a third shaft portion, are appropriately affixed to respectively corresponding walls,
an axis of the first shaft portion and/or an axis of the third shaft portion is tilted with respect to an axis of the second shaft portion,
wherein the third shaft portion is coupled to a shaft-and-pinion assembly, of the two shaft-and-pinion assemblies, at one end of the third shaft portion and coupled substantially moveably to the second shaft portion via a joint at the other end of the third shaft portion.

18. A method comprising:
using the article of manufacture according to claim 1, repositioning the slide-out module of the RV in a direction substantially transverse to the shaft in a substantially un-impeded manner while the upper and lower shaft-and-pinion housings remain angularly misaligned with respect to one another.

19. A method according to claim 18, wherein said repositioning includes repositioning the slide-out module of the RV in a direction substantially transverse to the shaft in a substantially un-impeded manner while axes of the first and second shaft portions remaining angularly misaligned with respect to one another.

20. A method according to claim 18, comprising:
when the article of manufacture includes an anchoring mechanism that contains:
a latch portion configured as a plate of material that has a thickness, a slot in the thickness, and an opening throughout the thickness,
wherein the opening is dimensioned to be removably affixed on the shaft passing therethrough such as to have the latch portion rotatable about a shaft axis substantially synchronically with rotation of the shaft about the shaft axis;
and
an anchor portion dimensioned to be received into the slot as a result of rotation of the latch about the shaft axis and released from the slot as a result of counter-rotation of the latch about the shaft axis,
performing at least the following steps:
(a) while retracting a slide-out module extended from an RV, spinning in a first direction and about the shaft axis both the shaft and the latch portion affixed thereto;
in response to said spinning, engaging the anchor portion, which is attached to a wall of the slide-out module, with the slot; and
(b) continuing to spin the latch portion on the shaft axis in the first direction to reposition the anchor portion from a first position within the slot to a second position within the slot,
wherein the first position is at a first radial distance from the shaft axis and the second position is at a second radial distance from the shaft axis.

\* \* \* \* \*